chrome-green, and others, are utilized as dispersing agents that they produce stable dispersions and have the desirable property in such dispersions of irreversibility. Furthermore, all or certain of these materials will function better as dispersing agents if one or more of the more active dispersing agents, such as mentioned above, are utilized in the process of production of the dispersion. In this way simple dispersions, or complex dispersions, as may be desired, are produced at the will of the operator, and at the same time the desirable feature is available of predetermining the color of the finished dispersion by selecting as the dispersing agent or as one of the dispersing agents that oxide or other pigment giving the desired color.

This application contains the disclosure of my co-pending application serial No. 724,291, filed July 5, 1924.

I claim:

1. A dispersion of bitumen in water comprising bitumen, water and a mixture for preparing and maintaining the dispersion, said mixture comprising grinding material divided to such an extent as to be capable of grinding action but incapable of maintaining a dispersion and consisting of an element of the group consisting of silica, slate dust, barytes, marble dust, powdered calcite, fibrous talc, zinc oxide, precipitated barium sulphate, mineral fillers and dispersing material consisting of an element of the group consisting of basic sulphates of copper, basic sulphates of iron, insoluble phosphates, ferric oxides, aluminum oxides, and chrome green, each element of said second group of elements being in the state in which it is deficient in grinding action but effective to maintain a dispersion affected by grinding.

2. A dispersion of bitumen in water comprising bitumen, water and a mixture for preparing and maintaining the dispersion, said mixture comprising grinding material consisting of an element of the group consisting of silica, slate dust, barytes, marble dust, powdered calcite, fibrous talc, zinc oxide, precipitated barium sulphate mineral fillers and dispersing material consisting of an element of the group consisting of basic sulphates of copper basic sulphates of iron, insoluble phosphates, ferric oxides, aluminum oxides and chrome green.

3. The method of dispersing bitumen in water, comprising grinding water and bitumen together in the presence of a compound dispersing agent comprising a mixture of a grinding substance divided to such an extent as to be incapable of itself of maintaining a dispersion and consisting of an element of the group consisting of silica, slate dust, barytes, marble dust, powdered calcite, fibrous talc, zinc oxide and precipitated barium sulphate, mineral fillers and a dispersing substance consisting of an element of the group consisting of basic sulphates of copper, basic sulphates of iron, insoluble phosphates, ferric oxides, aluminum oxides, and chrome green, each element of said second group of elements being in the state in which it has comparatively no grinding action.

In witness whereof I have hereunto set my hand, at Washington, D. C., this 29th day of October, 1930.

RICHARD W. LEWIS.

Patented Aug. 2, 1932

1,869,381

UNITED STATES PATENT OFFICE

RICHARD W. LEWIS, OF MONTCLAIR, NEW JERSEY

DISPERSIONS AND THE PRODUCTION THEREOF

No Drawing.   Application filed October 29, 1930.  Serial No. 491,969.

My present invention relates to dispersions and to processes and methods of preparing them. It relates particularly to dispersions of bituminous material in water, to dispersing agents, to disintegrating or shredding agents for the bituminous material, and to methods and processes of using said agents for preparing the dispersions, and is applicable in the arts generally.

I have discovered that by using an inert material with a peptizer capable of being wetted by the dispersing medium, together with an inert grinding material, that an emulsion of bituminous material in water, for instance, can be produced with dispersing agents that are cheap and plentiful but which otherwise cannot be used in producing such dispersions, or which are effective to but a slight degree as dispersing agents.

It is then an object of my invention to provide a dispersing mixture or slip comprising an inert disintegrating material, and a peptizable but otherwise inert or slightly active substance as a dispersing agent for producing a dispersion, as for example one of a bitumen in water.

It is further an object of my invention to provide methods and processes for grinding or disintegrating the dispersed material and producing a dispersion thereof in the dispersing medium.

Other objects of my invention will appear from the specifications.

As grinding material I use finely divided material which is harder than the material to be dispersed, such as silica, slate dust, barytes, marble dust and other forms of powdered calcite, fibrous talc, and various artificial preparations, such as the zinc oxide pigment of commerce and preciptated barium sulphate. In fact, for the intended purpose there may be used most of the insoluble inorganic substances such, for example, as the class of substances known as mineral fillers and which are readily obtainable commercially in suitable powdered form, provided only that the pulverization of the material has been carried far enough to permit of its forming a paste or mud when mixed with water but has not been carried far enough so that the individual particles are capable of acting as true emulsifying agents. From such a classification I exclude clay and other so-called colloidal materials whose sub-division cannot be arrested at will. Such materials are excluded because of the fact that it is difficult, if not impossible, to arrest the progress of their subdivision and confine it to the grinding stage without permitting it to pass into the stage where the materials might be effective as emulsifying agents. Also, from the class of grinding agents having comparatively no emulsifying action, within the intent of this invention, are excluded insoluble substances in the sol or soft hydrated gel states.

The exact stage of sub-division of the grinding agent falling within the scope of this invention varies with the nature of the individual material chosen as the grinding agent. For most of the materials commercially available the invention can properly be exercised by the selection of what is known commercially as 200-mesh material, but in view of differences in properties of different materials and even of the same material obtained from different sources it is almost impossible to specify what mesh is the most suitable. For example, substances such as silica, slate dust, barytes, zinc oxide, or precipitated barium sulphate might properly be used as grinding agents in the grade known as 325-mesh without exerting appreciable true emulsifying action.

It is possible to practice this invention with various substances over a wide range of sub-division. As a general principle the more active the true emulsifying agent used, the coarser may be the grinding agent. With various emulsifying agents, grinding agents powdered as coarse as 40-mesh or as fine as 450-mesh may be used within the scope of this invention. It must of course be realized that in the commercially available pulverized material suitable for use as a grinding agent there will be unavoidably present a small proportion of material in a state of sub-division considerably finer than the mesh of the screen which has been employed in its classification and this small amount of ultra-fine material